US012753554B2

(12) United States Patent
Bjorklund

(10) Patent No.: US 12,753,554 B2
(45) Date of Patent: Oct. 6, 2026

(54) CORRUGATED BOARD FOR HUMID CONDITIONS

(71) Applicant: BILLERUDKORSNÄS AB, Solna (SE)

(72) Inventor: Magnus Bjorklund, Hammaro (SE)

(73) Assignee: BILLERUD AKTIEBOLAG (PUBL), Solna (SE)

( * ) Notice: Subject to any disclaimer, the term of this patent is extended or adjusted under 35 U.S.C. 154(b) by 488 days.

(21) Appl. No.: 18/562,268

(22) PCT Filed: May 19, 2022

(86) PCT No.: PCT/EP2022/063614

§ 371 (c)(1),
(2) Date: Nov. 17, 2023

(87) PCT Pub. No.: WO2022/243455

PCT Pub. Date: Nov. 24, 2022

(65) Prior Publication Data

US 2024/0240407 A1 Jul. 18, 2024

(30) Foreign Application Priority Data

May 19, 2021 (EP) .................................... 21174601

(51) Int. Cl.

| | |
|---|---|
| ***D21H 27/10*** | (2006.01) |
| ***B32B 29/00*** | (2006.01) |
| ***B32B 29/06*** | (2006.01) |
| ***B32B 29/08*** | (2006.01) |
| ***B65D 65/40*** | (2006.01) |
| ***B65D 85/34*** | (2006.01) |
| ***D21H 11/04*** | (2006.01) |
| ***D21H 11/06*** | (2006.01) |
| ***D21H 27/38*** | (2006.01) |
| ***D21H 27/40*** | (2006.01) |

(52) U.S. Cl.

CPC ........... *D21H 27/10* (2013.01); *B32B 29/005* (2013.01); *B32B 29/06* (2013.01); *B32B 29/08* (2013.01); *B65D 65/403* (2013.01); *B65D 85/34* (2013.01); *D21H 11/04* (2013.01); *D21H 11/06* (2013.01); *D21H 27/38* (2013.01); *D21H 27/40* (2013.01); *B32B 2307/4026* (2013.01); *B32B 2307/718* (2013.01); *B32B 2439/02* (2013.01); *B32B 2439/62* (2013.01); *B32B 2439/70* (2013.01); *B65D 2565/382* (2013.01)

(58) Field of Classification Search

None

See application file for complete search history.

(56) References Cited

U.S. PATENT DOCUMENTS

| | | | |
|---|---|---|---|
| 6,190,744 | B1 | 2/2001 | Mutsuo et al. |
| 2021/0040696 | A1 | 2/2021 | Kohler |

FOREIGN PATENT DOCUMENTS

| | | | |
|---|---|---|---|
| WO | WO2015/044821 | A1 | 4/2015 |

*Primary Examiner* — James C Yager

(74) *Attorney, Agent, or Firm* — Stites & Harbison PLLC; Richard S. Myers, Jr.

(57) ABSTRACT

There is provided a container having at least one wall composed of a corrugated board comprising an inner linerboard, an outer linerboard and a fluting arranged between the inner linerboard and the outer linerboard, characterized in that the hygroexpansivity in the CD of the inner linerboard is higher than the hygroexpansivity in the CD of the outer linerboard, wherein hygroexpansivity is measured according to ISO 8226-2:1990.

17 Claims, No Drawings

CORRUGATED BOARD FOR HUMID CONDITIONS

CROSS REFERENCE TO RELATED APPLICATIONS

This application is a § 371 National Phase Application of PCT/EP2022/063614 filed May 19, 2022, which claims priority to EP21174601.1 filed May 19, 2021.

TECHNICAL FIELD

The present disclosure relates to the field of corrugated board, in particular boxes formed thereof that are intended for use in humid climates.

BACKGROUND

A corrugated board typically comprises an outer linerboard (that faces the outside of a box formed from the corrugated board), an inner linerboard (that faces the inside of the box) and a fluting (also referred to as corrugated medium) arranged between the outer and the inner linerboard. The outer linerboard is often a so called white top liner that forms a surface suitable for printing.

The performance of a corrugated board is often measured using the box compression test (BCT), which is the capability of a box formed from the corrugated board to withstand a compressive force. Accordingly, "BCT strength" (sometimes referred to as stacking strength) is an often-discussed property of a box or package of corrugated board.

The BCT strength is typically negatively affected by a humid climate. This is because of the hygroscopicity of the paper material. When the paper material absorbs moisture, the number of fibre-fibre bonds is reduced and the load-bearing capacity is impaired. Hence, many different approaches to overcoming the hygroscopicity problem have been suggested in the prior art.

SUMMARY

An object of the present disclosure is to improve the performance of corrugated board in a humid climate and/or reduce the amount of material in corrugated board without impairing performance in such climate.

As indicated above, the hygroscopicity of linerboard in a humid climate has been considered a problem and much effort has been devoted to reducing it.

The present inventor has however realized that hygroexpansivity can be a beneficial property in packaging if utilized correctly. The present invention is based on the insight that a bulging tendency of a container wall is beneficial if directed inwards. This is because the inward-bulging action creates a stabilized state by counteracting the outwards-directed force exerted on the container wall by the contents of the filled container. When the hygroexpansivity in the cross direction (CD) of the inner linerboard is higher than the hygroexpansivity in the CD of the outer linerboard, the container wall is predestined to bulge inwards in humid climates and thus designed to adopt the stabilized configuration under the conditions that are normally toughest on corrugated board containers. The present disclosure is focused on the CD of the linerboard since this is the direction that carries weight in most box and tray constructions. Further, the long side of the bottom of a typical fruit tray or removal box typically extends in the CD of the linerboard.

Accordingly, the present disclosure provides a container having at least one wall composed of a corrugated board comprising an inner linerboard, an outer linerboard and a fluting arranged between the inner linerboard and the outer linerboard, characterized in that the hygroexpansivity in the CD of the inner linerboard is higher than the hygroexpansivity in the CD of the outer linerboard.

In the present disclosure, hygroexpansivity is measured according to ISO 8226-2:1990. In this measurement, the length in the CD at 50% RH is compared to the length in the CD at 84% RH.

Further, there is provided a use of such a container for packaging in a relative humidity of at least 80%, such as at least 85%.

The present disclosure also provides a corrugated board material in which the linerboard intended to face the inside of the container has the higher hygroexpansivity in the CD. This is expressed as a corrugated board comprising a first linerboard, a second linerboard and a fluting arranged between the first and the second linerboard, wherein the first linerboard is unbleached and the second linerboard is a white top linerboard or a pigment-coated linerboard, characterized in that the hygroexpansivity in the CD of the first linerboard is higher than the hygroexpansivity in the CD of the second linerboard. As understood by the skilled person, the white top linerboard or the pigment-coated linerboard will face the outside of the container according to the intended use.

Finally, there is provided a corrugated board that reflects the paper consumption reduction enabled by the present disclosure. This corrugated board comprises a first linerboard, a second linerboard and a fluting arranged between the first and the second linerboard, characterized in that the grammage of the first linerboard is lower than the grammage of the second linerboard and in that the hygroexpansivity in the CD of the first linerboard is higher than the hygroexpansivity in the CD of the second linerboard. The first linerboard will face the inside of the container according to the intended use.

DETAILED DESCRIPTION

As a first aspect of the present disclosure, there is provided a container having at least one wall composed of a corrugated board comprising an inner linerboard, an outer linerboard and a fluting arranged between the inner linerboard and the outer linerboard, characterized in that the hygroexpansivity in the CD of the inner linerboard is higher than the hygroexpansivity in the CD of the outer linerboard.

Preferably, the hygroexpansivity in the CD of the inner linerboard is at least 20% higher than the hygroexpansivity in the CD of the outer linerboard.

For the avoidance of doubt, the inner linerboard faces the inside of the container and the outer linerboard faces the outside of the container.

The wall may be a bottom wall or a side wall. Preferably, the container comprises at least two side walls, such as four side walls, composed of said corrugated board. In one embodiment, the container comprises four side walls and a bottom wall composed of said corrugated board.

A suitable example of an inner linerboard that provides the higher hygroexpansivity is a containerboard formed from a furnish comprising at least 60% by dry weight of a semi-chemical pulp, such as a furnish comprising at least 70% by dry weight of a semi-chemical pulp, such as a furnish comprising at least 70% by dry weight of a semi-chemical pulp. The semi-chemical pulp is preferably NSSC pulp. The wood used for producing the semi-chemical pulp is typically at least 90% by dry weight hardwood, such as birch. Hence, the inner linerboard may be a non-corrugated semi chemical fluting. A "semi chemical fluting" is defined in the $5^{th}$ edition of Cepi ContainerBoard's European list of corrugated base papers (updated October 2017). Cepi ContainerBoard (CCB) is a European industry association of producers of corrugated case materials, also called containerboard.

The proportion of recycled fibres in the inner linerboard of the present disclosure is preferably below 15%, such as below 10%, such as below 5%. In one embodiment, the inner linerboard contains substantially no recycled fibres.

Further, the fluting of the corrugated board is preferably a corrugated semi chemical fluting. Hence both the fluting and the inner linerboard may be formed from the same type of material.

In one embodiment, the outer linerboard is a kraftliner, such as a brown kraftliner, a brown kraft top liner, a white top kraftliner or a white coated kraftliner. These four types of kraftliner are also defined in CCB's list discussed above.

For many applications, the corrugated board concept of the present disclosure allows for a reduction of the grammage of the inner linerboard. Hence the grammage (g/m$^2$) of the inner linerboard may be lower than the grammage of the outer linerboard. In one embodiment, it is at least 15% lower, such as at least 20% lower, such as at least 25% lower.

The container of the first aspect is typically a box or a tray. Examples of boxes are removal boxes and heavy-duty boxes. An example of a tray is a produce tray, also referred to a fruit- and vegetable (F&V) tray.

The corrugated board of the F&V tray may for example be single wall, such as C flute, or double wall, such as BC flute. The corrugated board of the removal box may for example be double wall, such as BC flute. The corrugated board of the heavy-duty box may for example be double wall, such as AA flute.

The grammage of the outer linerboard is typically 150-320 g/m$^2$. The grammage of the inner linerboard is typically 130-220 g/m$^2$, such as 140-200 g/m$^2$.

In case of a C flute corrugated board for a F&V tray, the grammage of the outer linerboard is typically 250-320 g/m$^2$ and/or the grammage of the of the inner linerboard is typically 160-220 g/m$^2$, such as 180-220 g/m$^2$.

In case of a BC flute corrugated board for a F&V tray, the grammage of the outer linerboard is typically 170-230 g/m$^2$ and/or the grammage of the of the inner linerboard is typically 110-170 g/m$^2$, such as 120-160 g/m$^2$.

In case of a BC flute corrugated board for a removal box, the grammage of the outer linerboard is typically 150-200 g/m$^2$ and/or the grammage of the of the inner linerboard is typically 110-170 g/m$^2$, such as 120-160 g/m$^2$.

In case of an AA flute corrugated board for a heavy-duty box, the grammage of the outer linerboard is typically 240-320 g/m$^2$ and/or the grammage of the of the inner linerboard is typically 180-220 g/m$^2$.

As understood from the above, the corrugated board may comprise a middle linerboard and a second fluting. In one embodiment, it comprises two middle linerboards and a second and a third fluting (triple wall).

As a second aspect of the present disclosure, there is provided a use of the container of the first aspect for packaging in a relative humidity of at least 80%, such as at least 85%. An example of such packaging is that of fruit or vegetables transported or stored in an atmosphere of 80%-98% RH. The temperature of such an atmosphere is typically below 20° C. and often 0-10° C.

As a third aspect, there is provided a corrugated board comprising a first linerboard, a second linerboard and a fluting arranged between the first and the second linerboard, wherein the first linerboard is unbleached and the second linerboard is a white top linerboard or a pigment-coated linerboard, characterized in that the hygroexpansivity in the CD of the first linerboard is higher than the hygroexpansivity in the CD of the second linerboard.

The fact that the second linerboard is a white top linerboard or a pigment-coated linerboard reflects shows that it will be the outer linerboard when the corrugated board of the third aspect is used in a container. Hence what is stated above regarding the outer linerboard applies to the second linerboard of the third aspect mutatis mutandis. Correspondingly, what is stated above regarding the inner linerboard applies to the first linerboard of the third aspect mutatis mutandis. Other embodiments of the first aspect also apply to the third aspect mutatis mutandis.

As a fourth aspect, there is provided a corrugated board comprising a first linerboard, a second linerboard and a fluting arranged between the first and the second linerboard, characterized in that the grammage of the first linerboard is lower than the grammage of the second linerboard and in that the hygroexpansivity in the CD of the first linerboard is higher than the hygroexpansivity in the CD of the second linerboard. Again, the second linerboard is intended to be the outer linerboard when the corrugated board of the fourth aspect is used in a container. Hence what is stated above regarding the outer linerboard applies to the second linerboard of the fourth aspect mutatis mutandis. Correspondingly, what is stated above regarding the inner linerboard applies to the first linerboard of the fourth aspect mutatis mutandis. Other embodiments of the first aspect also apply to the fourth aspect mutatis mutandis. Hence, the grammage of the first linerboard may be at least 15% lower, such as at least 20% lower, such as at least 25% lower, than the grammage of the second linerboard.

EXAMPLES

Example 1

A brown Fruit & Vegetable (F&V) single wall tray in the prior art is typically formed from a C flute corrugated board of:

- an outer 300 g/m$^2$ brown kraftliner;
- a 160 g/m$^2$ fluting of semichemical containerboard; and
- an inner 300 g/m$^2$ brown kraftliner.

To replace this prior art corrugated board, the present disclosure provides a C flute corrugated board of:

- an outer 300 g/m$^2$ brown kraftliner;
- a fluting of a 160 g/m$^2$ semichemical containerboard; and
- an inner liner of a 210 g/m$^2$ semichemical containerboard (a non-corrugated semi chemical fluting).

This new C flute corrugated board means a reduction of the paper consumption by 12%, without impaired performance in humid climates.

In F&V trays, downward bottom deflection may be particularly undesirable since the contents of the underlying tray is often pressure sensitive. Hence, the board construction of the present disclosure may be particularly beneficial in F&V trays.

Example 2

A brown Fruit & Vegetable (F&V) double wall tray in the prior art is typically formed from BC flute corrugated board of:

an outer 200 g/m$^2$ brown kraftliner;
a 140 g/m$^2$ fluting of semichemical containerboard;
a middle 200 g/m$^2$ brown kraftliner;
a 140 g/m$^2$ fluting of semichemical containerboard;
an inner 200 g/m$^2$ brown kraftliner.

To replace this prior art corrugated board, the present disclosure provides a corrugated board of:

an outer 200 g/m$^2$ brown kraftliner;
a 140 g/m$^2$ fluting of semichemical containerboard;
a middle 200 g/m$^2$ brown kraftliner;
a 140 g/m$^2$ fluting of semichemical containerboard; and
an inner liner of a 140 g/m$^2$ semichemical containerboard.

This new BC flute corrugated board means a reduction of the paper consumption by 7%, without impaired performance in humid climates.

Example 3

A "white" Fruit & Vegetable (F&V) single wall tray in the prior art is typically formed from a C flute corrugated board of:

an outer 300 g/m$^2$ white top kraftliner;
a 160 g/m$^2$ fluting of semichemical containerboard; and
an inner 300 g/m$^2$ brown kraftliner.

To replace this prior art corrugated board, the present disclosure provides a C flute corrugated board of:

an outer 300 g/m$^2$ white top kraftliner;
a fluting of a 160 g/m$^2$ semichemical containerboard; and
an inner liner of a 210 g/m$^2$ semichemical containerboard.

This new C flute corrugated board means a reduction of the paper consumption by 12%, without impaired performance in humid climates.

Example 4

A brown Fruit & Vegetable (F&V) double wall tray in the prior art is typically formed from BC flute corrugated board of:

an outer 200 g/m$^2$ white top kraftliner;
a 140 g/m$^2$ fluting of semichemical containerboard;
a middle 200 g/m$^2$ brown kraftliner;
a 140 g/m$^2$ fluting of semichemical containerboard;
an inner 200 g/m$^2$ brown kraftliner.

To replace this prior art corrugated board, the present disclosure provides a corrugated board of:

an outer 200 g/m$^2$ white top kraftliner;
a 140 g/m$^2$ fluting of semichemical containerboard;
a middle 200 g/m$^2$ brown kraftliner;
a 140 g/m$^2$ fluting of semichemical containerboard; and
an inner liner of a 140 g/m$^2$ semichemical containerboard.

This new BC flute corrugated board means a reduction of the paper consumption by 7%, without impaired performance in humid climates.

Example 5

A double wall removal box in the prior art is typically formed from BC flute corrugated board of:

an outer 175 g/m$^2$ brown kraftliner;
a 120 g/m$^2$ fluting of semichemical containerboard;
a middle 150 g/m$^2$ brown kraftliner;
a 120 g/m$^2$ fluting of semichemical containerboard;
an inner 200 g/m$^2$ brown kraftliner.

To replace this prior art corrugated board, the present disclosure provides a corrugated board of:

an outer 175 g/m$^2$ brown kraftliner;
a 120 g/m$^2$ fluting of semichemical containerboard;

a middle 150 g/m$^2$ brown kraftliner;
a 120 g/m$^2$ fluting of semichemical containerboard; and
an inner liner of a 140 g/m$^2$ semichemical containerboard.

This new BC flute corrugated board means a reduction of the paper consumption by 8%, without impaired performance in humid climates.

Example 6

A heavy-duty double wall box in the prior art is typically formed from AA flute corrugated board of:

an outer 280 g/m$^2$ brown kraftliner;
a 175 g/m$^2$ fluting of semichemical containerboard;
a middle 186 g/m$^2$ brown kraftliner;
a 175 g/m$^2$ fluting of semichemical containerboard;
an inner 280 g/m$^2$ brown kraftliner.

To replace this prior art corrugated board, the present disclosure provides a corrugated board of:

an outer 280 g/m$^2$ brown kraftliner;
a 175 g/m$^2$ fluting of semichemical containerboard;
a middle 186 g/m$^2$ brown kraftliner;
a 175 g/m$^2$ fluting of semichemical containerboard; and
an inner liner of a 200 g/m$^2$ semichemical containerboard.

This new AA flute corrugated board means a reduction of the paper consumption by 7%, without impaired performance in humid climates.

Example 6

A filled Bag-In-Box (BIB) package has a great bulging tendency. Hence, tests on BIB packages were carried out to show the effect of the invention.

As a reference, a BIB package was formed from a containerboard that is typical in the prior art. This containerboard was composed of:

an outer 200 g/m$^2$ white top kraftliner;
a 127 g/m$^2$ fluting of semichemical (NSSC) containerboard; and
an inner 200 g/m$^2$ brown kraftliner.

An inventive BIB package was formed from a containerboard composed of:

an outer 200 g/m$^2$ white top kraftliner;
a 127 g/m$^2$ fluting of semichemical (NSSC) containerboard; and
an inner liner of a 165 g/m$^2$ semichemical (NSSC) containerboard (a non-corrugated semi chemical fluting).

The BCT of the reference BIB and the inventive BIB, each filled with three litres of liquid, was tested under two different conditions, 50% relative humidity (RH) and 90% RH. Further, the extent panel bulging after 24 h in 90% RH was tested. The results are presented in table 1 below.

TABLE 1

| | Total grammage of corrugated board | BCT 50% RH | BCT 90% RH | Panel bulging 90% RH |
|---|---|---|---|---|
| Reference BIB | 564 g/m$^2$ | 119 kg | 58.7 kg | 8.00 mm |
| Inventive BIB | 529 g/m$^2$ | 121 kg | 65.5 kg | 5.99 mm |
| Difference | −6.2% | +1.6% | +11.6% | −25% |

Example 6

The hygroexpansivity in the CD of a 175 g/m$^2$ white top kraftliner (WTKL) was compared to that of a 175 g/m$^2$ non-corrugated semi chemical fluting produced from a furnish of about 90% NSSC pulp and 10% kraft pulp in accordance with ISO 8226-2:1990. At 84% RH, the non-corrugated semi chemical fluting was 1.31% longer than at 50% RH. In contrast, the WTKL was 1.01% longer at 84% RH than at 50% RH. The hygroexpansivity in the CD was thus 29.7% ((1.31-1.01)/10.1) higher for the non-corrugated semi chemical fluting, which is suitable for use as the inner linerboard according to the present disclosure.

The invention claimed is:

1. A container having at least one wall composed of a corrugated board comprising an inner linerboard, an outer linerboard and a fluting arranged between the inner linerboard and the outer linerboard, characterized in that the hygroexpansivity in the cross direction (CD) of the inner linerboard is higher than the hygroexpansivity in the cross direction (CD) of the outer linerboard, wherein hygroexpansivity is measured according to ISO 8226-2:1990.

2. The container of claim 1, wherein the inner linerboard is a containerboard formed from a furnish comprising at least 80% by dry weight of a semi-chemical pulp.

3. The container of claim 2, wherein the semichemical pulp is formed from at least 90% by dry weight of hardwood.

4. The container of claim 1, wherein the outer linerboard is a kraftliner.

5. The container of claim 1, wherein the grammage of the inner linerboard is lower than the grammage of the outer linerboard.

6. The container of claim 1, which is a box or a tray.

7. The container of claim 6, which is a produce tray.

8. The container of claim 1, wherein the corrugated board further comprises a middle linerboard and a second fluting.

9. A corrugated board comprising a first linerboard, a second linerboard and a fluting arranged between the first and the second linerboard, wherein the first linerboard is unbleached and the second linerboard is a white top linerboard or a pigment-coated linerboard, wherein the hygroexpansivity in the cross direction (CD) of the first linerboard is higher than the hygroexpansivity in the cross direction (CD) of the second linerboard, wherein hygroexpansivity is measured according to ISO 8226-2:1990.

10. The corrugated board of claim 9, wherein the white top linerboard is a white top kraftliner or a white coated kraftliner.

11. The corrugated board of claim 9, wherein the grammage of the first linerboard is lower than the grammage of the second linerboard.

12. The corrugated board of claim 9, wherein the first linerboard is a containerboard formed from a furnish comprising at least 80% by dry weight of a semi-chemical pulp.

13. A corrugated board comprising a first linerboard, a second linerboard and a fluting arranged between the first and the second linerboard, wherein the grammage of the first linerboard is lower than the grammage of the second linerboard and in that the hygroexpansivity in the cross direction (CD) of the first linerboard is higher than the hygroexpansivity in the cross direction (CD) of the second linerboard, and wherein hygroexpansivity is measured according to ISO 8226-2:1990.

14. The corrugated board of claim 13, wherein the first linerboard is a containerboard formed from a furnish comprising at least 80% by dry weight of a semi-chemical pulp.

15. The container of claim 2, wherein the semi-chemical pulp is a neutral sulfite semi-chemical (NSSC) pulp.

16. The corrugated board of claim 12, wherein the semi-chemical pulp is a neutral sulfite semi-chemical (NSSC).

17. The corrugated board of claim 13, wherein the semi-chemical pulp is a neutral suflite semi-chemical (NSSC).

* * * * *